United States Patent [19]
Okada

[11] Patent Number: 5,448,534
[45] Date of Patent: Sep. 5, 1995

[54] RADIO WITH RECORDING AND REPRODUCING FUNCTION

[75] Inventor: Setsuo Okada, Hokkaido, Japan

[73] Assignee: Hudson Soft Co., Ltd., Hokkaido, Japan

[21] Appl. No.: 151,644

[22] Filed: Nov. 15, 1993

[30] Foreign Application Priority Data

Sep. 20, 1993 [JP] Japan .................................. 5-256513

[51] Int. Cl.⁶ ............................................. H04H 9/00
[52] U.S. Cl. ...................................... 369/7; 455/33.1; 369/6
[58] Field of Search .................. 369/7, 6, 8; 455/89, 455/90, 345, 33.1, 32.1, 36.1, 38.1

[56] References Cited
U.S. PATENT DOCUMENTS
4,380,821  4/1983  Eckhardt ............................ 455/33.1

FOREIGN PATENT DOCUMENTS

| | | | |
|---|---|---|---|
| 3423607 | 1/1985 | Germany | 369/7 |
| 59-94940 | 5/1984 | Japan | 369/7 |
| 60-254831 | 12/1985 | Japan | 369/7 |
| 60-254833 | 12/1985 | Japan | 369/7 |
| 60-254835 | 12/1985 | Japan | 369/7 |
| 60-254836 | 12/1985 | Japan | 369/7 |
| 2127245 | 4/1984 | United Kingdom | 369/7 |

Primary Examiner—Georgia Y. Epps
Assistant Examiner—Tan Dinh
Attorney, Agent, or Firm—Lowe, Price, Leblanc & Becker

[57] ABSTRACT

A radio system has a detector detecting a required radio program, and supplying an instruction signal when the program is detected thereby. In accordance with the instruction signal, a recording unit begins to record the program.

9 Claims, 5 Drawing Sheets

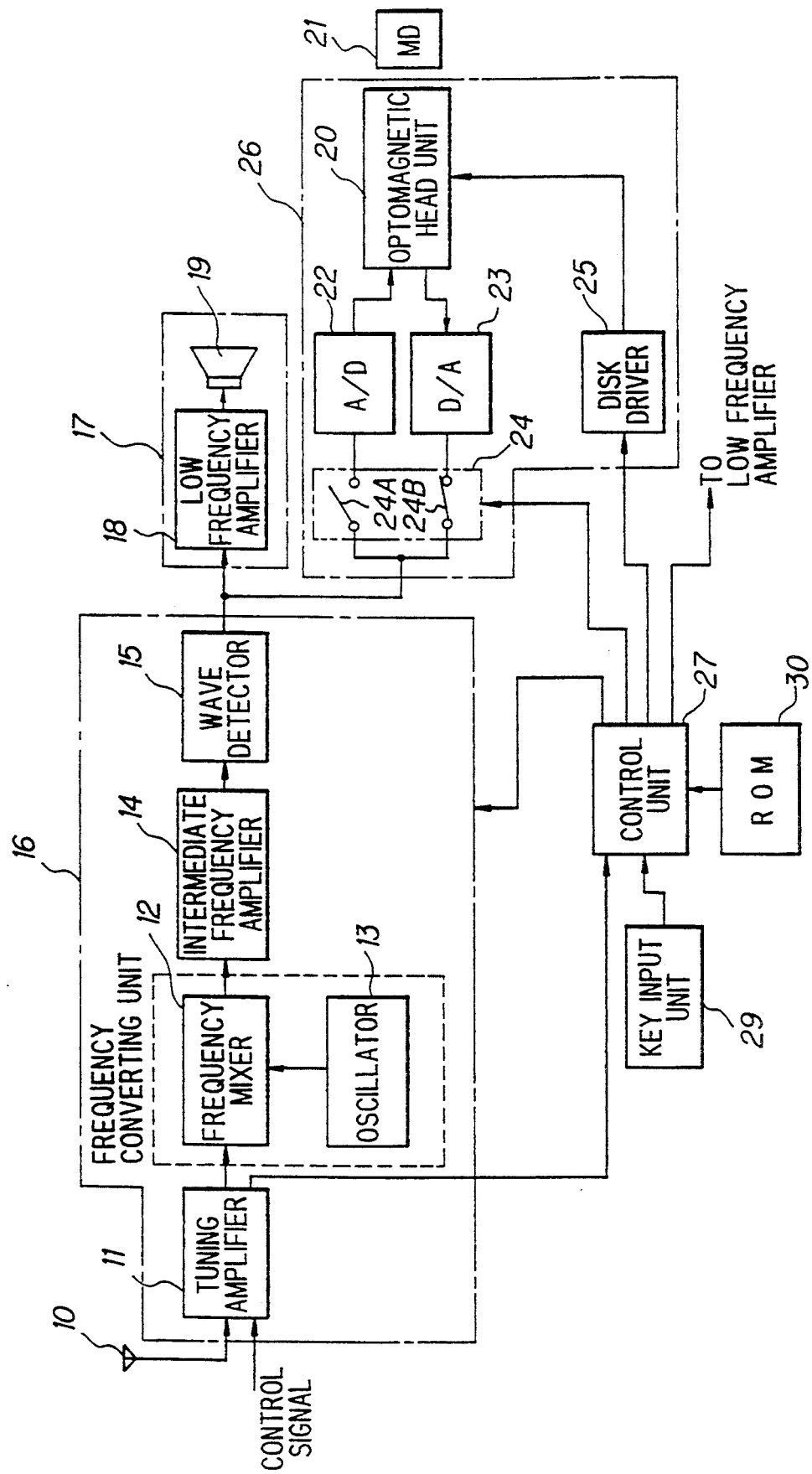

RADIO WITH RECORDING AND REPRODUCING FUNCTION

BACKGROUND OF THE INVENTION

The present invention relates to a radio which may record radio programs, and more particularly to an improved radio by which broadcasted programs may be easily reproduced at need.

Radios have advantage in that a variety of information may be acquired, while doing something, else for example, driving cars. However, people tend to easily miss important information, such as traffic information, weather information and the like.

In order to solve the above mentioned problem, traditionally, the currently broadcasted program is recorded on a tape and is reproduced at need. The speed of rewinding the tape is faster than that for reproducing, so that the reproduction program may overtake the currently broadcasted program.

According to the conventional radio, however, there is a disadvantage in that only the currently broadcasted program may be recorded. Therefore, if a listener misses to tune the radio to the needed program or misses to turn on the radio itself, needed information may not be acquired quickly.

SUMMARY OF THE INVENTION

Accordingly, it is an object of the invention is to provide a radio by which needed information may be acquired anytime easily.

According to the invention, a radio system includes a detector detecting a required radio program, and supplying an instruction signal when the program is detected thereby. In accordance with the instruction signal, the program begins being recorded.

BRIEF DESCRIPTION OF THE DRAWINGS

FIG. 5 is a block diagram showing a radio according to a fourth preferred embodiment of the invention.

DETAILED DESCRIPTION OF THE INVENTION

A radio according to the invention is now described in conjunction with appended drawings.

Figure 1:
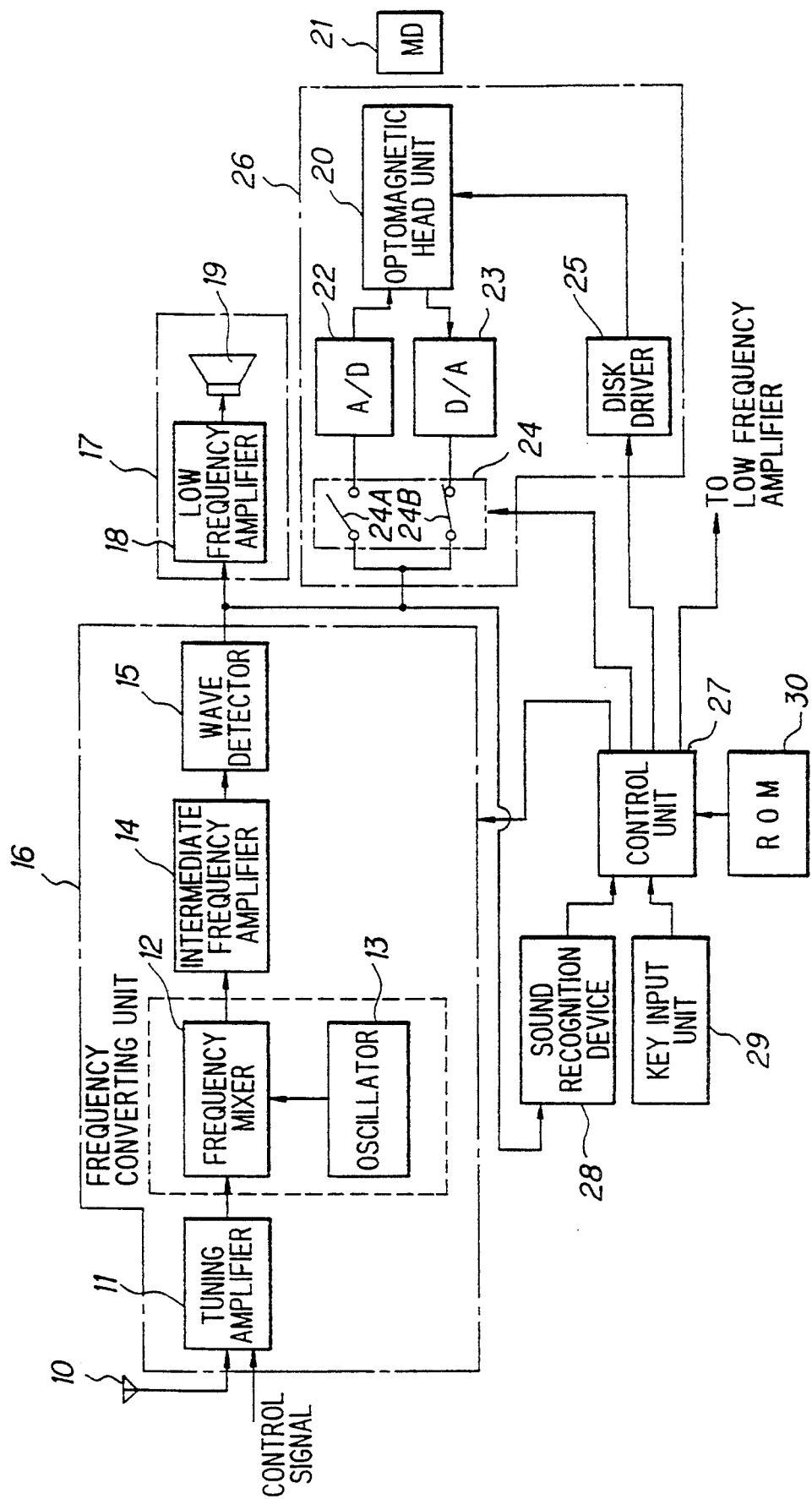
FIG. 1 is a block diagram showing a radio according to a first preferred embodiment of the invention.

FIG. 1 shows a radio system according to a first preferred embodiment, which includes an antenna 10, a receiving unit 16 for receiving radio waves in a predetermined range of frequency, a recording and reproducing unit 26 operating in recording and reproduction modes, a sound data output unit 17 for amplifying sound signals supplied from the receiving unit and reproduced signals from the recording and reproduction unit, and a controller 27 for controlling the operation modes of the recording and reproducing unit.

In the recording mode, the sound signals supplied from receiving unit 16 are recorded in a so-called mini-disk (or mini-card), which will be described later. In the reproduction mode, the sound signals recorded in the mini-disk are reproduced. The controller controls the recording and reproduction unit in response to instructions transferred from an external device.

The receiving unit includes a tuning amplifier 11 for amplifying the radio waves only in the predetermined range of frequency, an oscillator 13 for generating an oscillating frequency, a frequency mixer 12 for mixing the received radio waves and oscillating frequency to convert the frequency of the received radio waves into a lower intermediate frequency, an intermediate frequency amplifier 14 for amplifying the intermediate frequency, and a wave detector 15 for detecting the sound signals in an output signal of the intermediate frequency amplifier.

The recording and reproduction unit 26 includes a switch unit 24, an A/D converter 22, an optomagnetic head unit 20, a D/A converter 23 and a disk driver 25. The switch unit 24 is turned on and off to select one operation mode from the recording and reproduction modes. The A/D converter 22 converts the sound signal (analog signal), which is supplied from the wave detector, 15 into a digital signal. The optomagnetic head unit records the digital signal from the A/D converter 15 on the mini-disk, 21 and reproduces the recorded digital sound. The D/A converter 23 converts the digital sound signal, which is supplied from the optomagnetic head unit, 21 into an analog signal. The disk driver rotates the mini-disk 21 at a predetermined speed.

The sound output unit 17 includes a low frequency amplifier 18 for amplifying sound signals supplied from the wave detector 15 and mini-disk, 21 and a loudspeaker 19 for converting the sound signals to audible sound.

The controller is connected to a sound recognition device 28, an input device 29, and a ROM 30, which is for storing a predetermined program. The sound recognition device recognizes predetermined radio programs, such as traffic information, weather information and the like, from the sound signal supplied from the D/A converter 23. A variety of instructions and information may be supplied through the input device, such as a keyboard, to the radio. The controller 21 controls the receiving unit, 16 sound output unit 17 and recording and reproduction unit, 26 in accordance with information supplied from the sound recognition device, 28 input device 29 and ROM 30.

When the sound recognition device 28 detects sound corresponding to the needed program, the switches 24A and 24B turn on and off, respectively, to select the recording mode independently of the condition (on or off) of the low frequency amplifier 18. In the recording mode, the optomagnetic head unit 20 records the detected radio program on the mini-disk.

When the reproduction mode is selected by the input device, 29 the low frequency amplifier 18 turns on, the switches 24A and 24B turn off and on, respectively. In the reproduction mode, the optomagnetic head unit 20 reproduces the recorded program, and the reproduced sound is supplied to the loudspeaker 19.

In the reproduction mode, when a search instruction is supplied from the input device, 29 the controller 27 controls the operation speed of the disc driver 25. When the required program is found, the program is reproduced at a normal speed, but the other programs are reproduced at a high speed. Such search processing may be performed manually by using high-speed and normal-speed reproduction keys (not shown) on the input device 29.

The mini disk 21 is loaded in the optomagnetic head unit 20, and the receiving unit 16 is tuned to a predetermined frequency in advance. The required program, such as traffic information, is memorized in the sound recognition device 28.

When the sound recognition device 28 detects sound for the traffic information from the sound signal supplied from the wave detector, 15 a recognition signal is supplied to the controller 27. In response to the recognition signal, the recording and reproduction unit 26 comes in the recording mode under control of the controller 27. That is, the switches 24A and 24B turn on and off, respectively, to make the optomagnetic head unit 20 being in the recording mode.

In the recording mode, sound signals of the traffic information, which are supplied from the wave detector, 15 are converted 22 into digital sound signals by the A/D converter, and the digital signals are recorded on the mini-disk 21.

Figure 2:
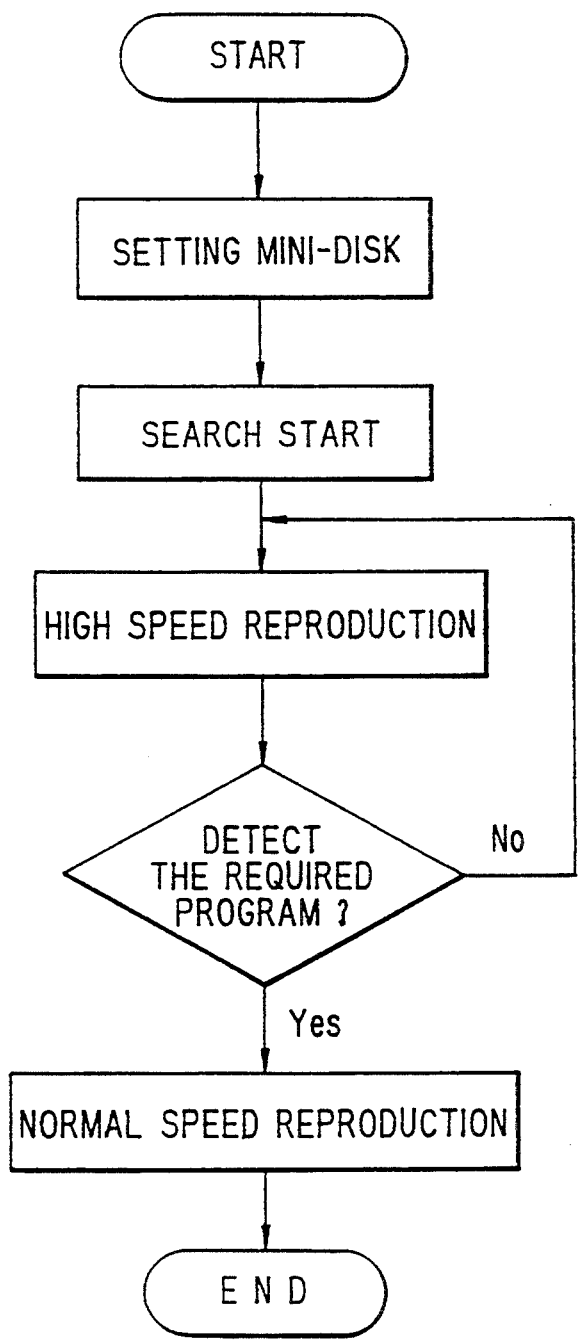
FIG. 2 is a flow chart showing reproduction operation of the first preferred embodiment.

FIG. 2 shows steps to reproduce the recorded sound information on the mini-disk. When the mini disk 21 is loaded in the optomagnetic head unit, 20 and the instruction for searching the traffic information program is given, the recording and reproduction unit 26 comes in the reproduction mode by the controller 27. That is, the switches 24A and 24B turn on and off, respectively, the optomagnetic head unit 20 operates in the reproduction mode, so that the mini-disk 21 is rotated at a high speed by the disk 25 driver.

Programs other than the traffic information are reproduced at a high speed, and the reproduced sound signals are supplied through the low frequency amplifier 18 to the loudspeaker 19.

When the sound recognition device detects the traffic information program, the program is reproduced at the normal speed under control of the controller.

The mini-disk may be available in homes, offices, cars and the like. In the above mentioned embodiment, if the traffic information program is recorded on the mini-disk at a region starting from a predetermined start address, the program may be reproduced without such searching processing.

Figure 3:
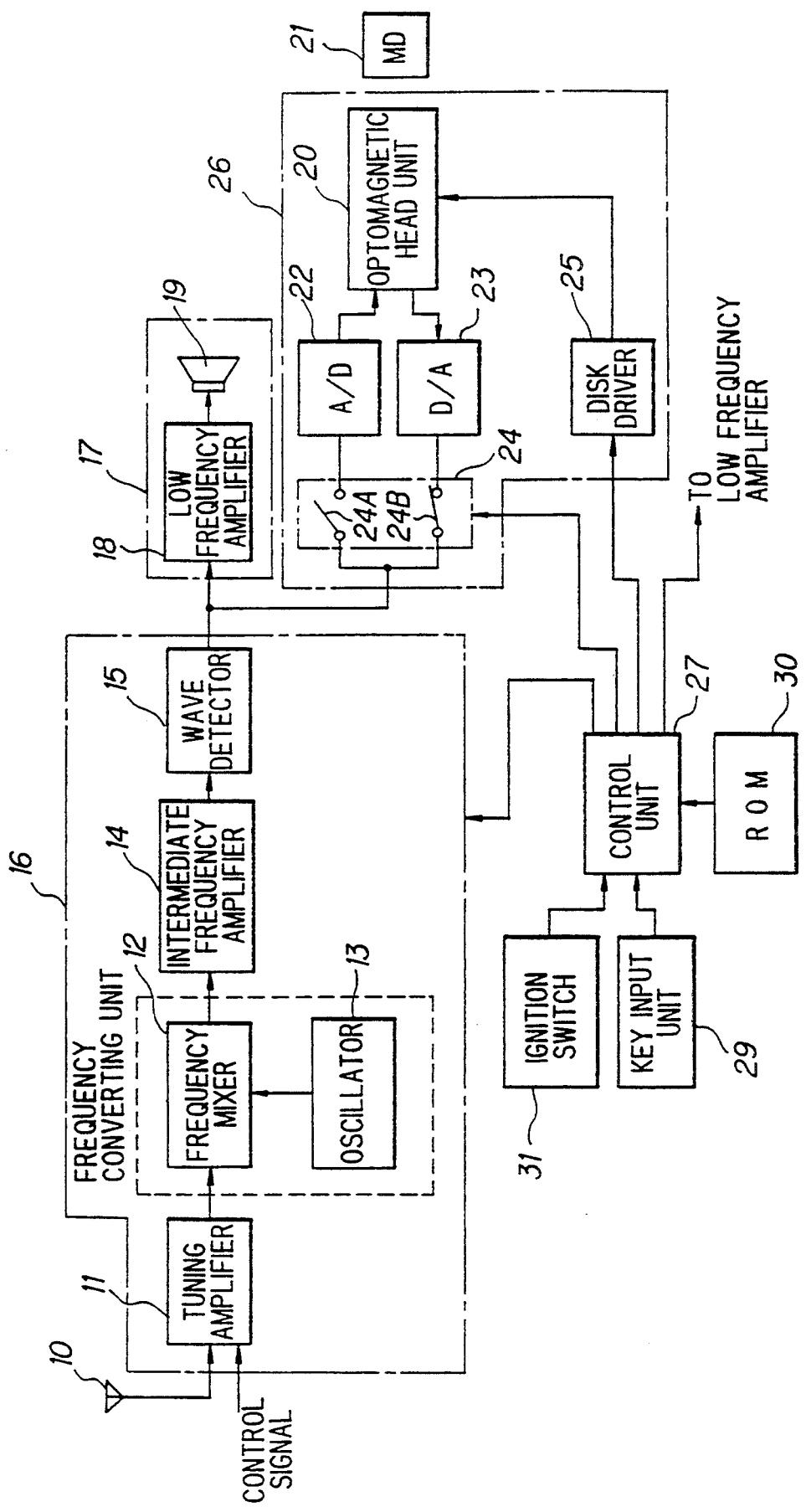
FIG. 3 is a block diagram showing a radio according to second preferred embodiment of the invention.

FIG. 3 shows a second preferred embodiment of the invention, which is applied to a radio in car. In response to a turn on signal of an ignition switch 31, a recording and reproducing unit 26 comes in a recording mode by a controller 27. The recording period of each radio program is limited.

Figure 4:
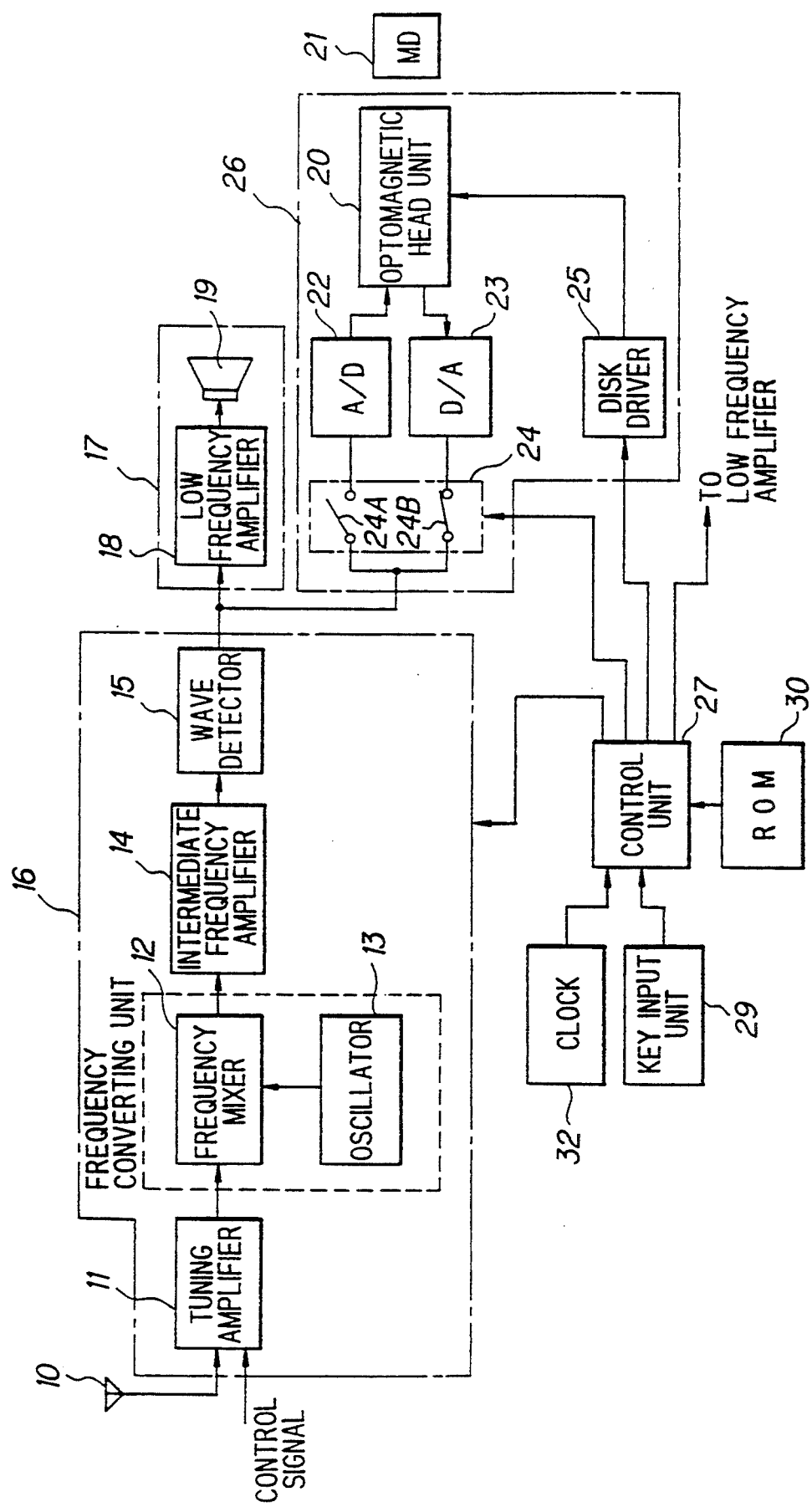
FIG. 4 is a block diagram showing a radio according to a third preferred embodiment of the invention.

FIG. 4 shows a third preferred embodiment of the invention, which includes a timer function. In this embodiment, when a time supplied to an input device 29 and a time on a clock 32 correspond to each other, a correspondence signal is supplied to a controller 27. In response to the corresponding signal, a recording and reproduction unit 26 comes in the recording mode.

FIG. 5 shows a fourth preferred embodiment of the invention, in which a radio wave of a predetermined frequency (for example, 1620 KHz), such as for traffic information, is monitored at a predetermined interval in sections on highway roads. The monitoring operation is realized by adjusting a tuning amplifier 11. When the radio wave of traffic information is received, the information is recorded automatically by a recording and reproduction unit 26.

In the above mentioned embodiments, the mini-disk is employed as a recording medium; however, cassette tapes and IC cards may be employed instead.

I claim:

1. A radio having a receiving unit for generating sound signals, a recording and reproducing unit for recording and reproducing said sound signals, respectively, and a sound data output unit for amplifying sound signals from the receiving unit and reproduced sound signals from the recording and reproducing unit, wherein a listener tends to miss important broadcast information when the radio is turned off, the radio comprising:

an input device for generating instruction signals for the radio, a controller responsive to said instruction signals for controlling the receiving unit, the recording and reproducing unit, and the sound data output unit, and wherein said controller is further responsive to a turn-on signal of an ignition switch for generating a signal to place said recording and reproducing unit into a recording mode, whereby broadcast information is recorded as soon as the ignition switch is turned on.

2. A radio with recording and reproducing functions for use in a vehicle having an ignition switch, comprising:

a receiving unit responsive to radio waves in a predetermined range of frequencies for generating sound signals;

a recording and reproducing unit for recording said sound signals in a recording mode and for reproducing said recorded sound signals in a reproducing mode;

a sound data output unit for amplifying sound signals from the receiving unit and reproduced sound signals from said recording and reproducing unit; and a controller responsive to a turn-on signal of said ignition switch for activating said receiving unit and for placing said recording and reproducing unit into said recording mode.

3. The combination of claim 2, further including a key input unit and a ROM for generating instruction signals for said controller.

4. A radio with recording and reproducing functions comprising:

a receiving unit responsive to radio waves in a predetermined range of frequencies for generating sound signals;

a recording and reproducing unit for operating in a recording mode and in a reproducing mode, in which said sound signals are recorded and reproduced, respectively, said unit further including an optomagnetic head unit and a disk driver;

a sound data output unit for amplifying said sound signals from said receiving unit and reproduced sound signals from said recording and reproducing unit;

an input unit for generating instruction signals for said radio; and a controller responsive to said instruction signals and to a turn-on signal of an ignition switch for controlling said receiving unit, said recording and reproducing unit, and said sound data output unit;

wherein said controller is responsive to said turn-on signal for activating the recording mode as soon as the ignition switch is turned on.

5. The radio of claim 4, wherein said input unit is a key input unit.

6. The radio of claim 4, wherein said input unit is a ROM.

7. A radio with recording and reproducing functions comprising:

receiving unit responsive to radio waves in a predetermined range of frequencies for generating sound signals;

a recording and reproducing unit for operating in a recording mode in which said sound signals are recorded, and in a reproducing mode in which said recorded sound signals are reproduced, said unit further including a switch unit for turning on and off one of the recording and reproducing modes, an A/D converter for converting said sound signals into digital signals, an optomagnetic head unit for recording said digital signals from the A/D converter on a recording medium, and a D/A converter for converting said digital signals stored on a recording medium into reproduced sound signals;

a sound data output unit for amplifying said sound signals from said receiving unit and said reproduced sound signals from said recording and reproducing unit;

a sound recognition device responsive to the sound signals supplied from said receiving unit and the reproduced sound signals from said D/A converter for recognizing predetermined radio programs, and for generating a sound recognition signal in response thereto;

input means for generating instruction signals for said radio; and a controller responsive to said instruction signals and to said sound recognition signal for controlling the recording and reproducing modes of the recording and reproducing unit, wherein said controller causes said recording and reproducing unit to reproduce programs other than the predetermined programs at a high speed, and to reproduce the predetermined programs at a normal speed.

8. The radio of claim 7, wherein said recording medium is a mini-disk, and said recording and reproducing unit further includes a disk driver for rotating said disc in said optometric head unit.

9. The radio of claim 7, wherein said input means includes a key input and a ROM.

* * * * *